United States Patent
Bruckbock (10) Patent No.: US 10,661,161 B2
(45) Date of Patent: May 26, 2020

(54) WIRELESS CHARGING ADAPTER WITH GAME CONTROL KEYS FOR COMPUTER GAME CONTROLLER

(71) Applicant: Sony Interactive Entertainment LLC, San Mateo, CA (US)

(72) Inventor: Thomas Bruckbock, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/111,836

(22) Filed: Aug. 24, 2018

(65) Prior Publication Data
US 2020/0061456 A1 Feb. 27, 2020

(51) Int. Cl.
*A63F 13/24* (2014.01)
*H02J 7/00* (2006.01)
*H02J 7/02* (2016.01)

(52) U.S. Cl.
CPC ............ *A63F 13/24* (2014.09); *H02J 7/0027* (2013.01); *H02J 7/025* (2013.01); *H02J 7/027* (2013.01)

(58) Field of Classification Search
None
See application file for complete search history.

(56) References Cited

U.S. PATENT DOCUMENTS

| | | | |
|---|---|---|---|
| 6,992,462 B1* | 1/2006 | Hussaini | A63F 13/06 320/114 |
| 2006/0022636 A1* | 2/2006 | Xian | G06F 3/03543 320/108 |
| 2006/0172801 A1* | 8/2006 | Hussaini | A63F 13/06 463/39 |
| 2007/0021209 A1* | 1/2007 | Hussaini | A63F 13/06 463/36 |

OTHER PUBLICATIONS

International Search Report and Written Opinion from the counterpart PCT application PCT/US20191044132 dated Nov. 1, 2019.

* cited by examiner

*Primary Examiner* — Ronald Laneau
(74) *Attorney, Agent, or Firm* — John L. Rogitz (57) ABSTRACT

A wireless charging adapter that can snap onto a computer game controller can be inductively coupled to a charging base to wirelessly recharge a battery in the controller. The adapter also can include keys that mirror keys on the controller so that a gamer can remove the adapter with controller from the charging base, keep the adapter on the controller, and use both the controller keys and adapter keys to control a computer game.

20 Claims, 8 Drawing Sheets

WIRELESS CHARGING ADAPTER WITH GAME CONTROL KEYS FOR COMPUTER GAME CONTROLLER

FIELD

The application relates to wireless charging adapters with game control keys for computer game controllers.

BACKGROUND

Wireless battery chargers conveniently permit recharging battery-powered devices.

SUMMARY

As understood herein, adapters for interfacing battery-powered game controllers with a wireless charging base may be located on the game controller in a position that can be used to leverage the adapters for additional purposes than charging. Combining a wireless charging adaptor with the ability to strategically locate duplicate game controller button controls on the adaptor, which is mounted on the back side of the controller, enhances and improve games play and provide a one-product solution to address two problems for computer gamers at the same time. Or, some implementations may omit the charging feature on the adapter.

An adapter that couples to an electronic device through a USB or equivalent connection is combined with one or more control buttons to interact with the electronic device. While it should be appreciated that this adapter in some examples is able to charge and/or interact with a multitude of electronic devices, in an illustrative example the adapter mounts on PlayStation® Dual Shock 4 (DS4) video game controller. This adapted connection enables the ability to wirelessly charge the DS4 game controller in some implementations and also copy or map one or more of the existing game controller interaction buttons if so desired. In this embodiment the adapter plugs into an input/output port of the game controller and mounts onto the back/bottom of the controller. In an example, the adapter includes a Qi-standard wireless charging coil and electronic circuitry to allow for wireless charging on any Qi standard charging pad. In addition, the adapter includes one or more buttons positioned so that they are located on the back or bottom side of the controller when the adapter is engaged with the controller and strategically positioned such that the buttons are easily accessible by one or more fingers that are normally not engaged with the controller interaction. Button mapping can be changed and mapped to any existing digital button on the game controller.

Accordingly, an assembly includes at least one game controller that includes a hand-holdable controller housing with at least one battery and plural control keys manipulable to input commands, including at least a first key manipulable to input a first command, to a computer game console. At least one adapter is mechanically engageable with the game controller and is electrically engageable with at least one electrical component in the controller housing. The adapter includes at least one adapter key manipulable to input the first command to the computer game console.

In some embodiments, at least one charging base can be provided on which the adapter, when mechanically engaged with/to the game controller, can be placed to inductively couple the adapter with the charging base to supply charging power through the adapter to the battery over at least one wireless charging path to recharge the battery.

In some embodiments the charging base has a flat mat-like surface on which the adapter is positioned to charge the battery. If desired, the adapter can be electrically engaged with the electrical component in the controller housing through at least one electrical wire engaged with an input/output port such as a universal serial bus (USB) port or extension port on the game controller.

In some implementations the controller housing includes a front portion holding the plural keys and a rear portion facing away from the front portion, and the adapter is mechanically engageable with the rear portion of the controller housing. The adapter can be snappingly engageable and disengageable with the controller housing by hand without tools and without requiring connectors to hold the adapter on the controller housing.

In non-limiting examples, the charging base is configured to hold plural game controllers at one time for charging the plural game controllers simultaneously. In addition to the first key to generate the first command, the adapter can include at least a second key manipulable to input a second command to a computer game console. In some embodiments the adapter may include conversion circuitry to convert AC power received from inductive coupling with the base to DC power to provide to the battery.

If desired, the adapter can include one or more lamps to indicate a state of a battery in the game controller, and/or to indicate a functional mapping of game controller keys to adapter keys.

In another aspect, wireless charging adapter that can snap onto a computer game controller can be inductively coupled to a charging base to wirelessly recharge a battery in the controller. The adapter also can include one or more keys that mirror respective keys on the controller so that a gamer can remove the adapter with controller from the charging base, keep the adapter on the controller, and use both the controller keys and adapter keys to control a computer game.

In another aspect, a method includes mechanically coupling a wireless charging adapter (WCA) with a computer game controller. The method includes operating the WCA to send commands to a computer game console and also operating the computer game controller to send commands to the computer game console. The method contemplates placing the WCA on a charging base to recharge a battery in the computer game console.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, wireless battery rechargers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments. "A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Figure 1:
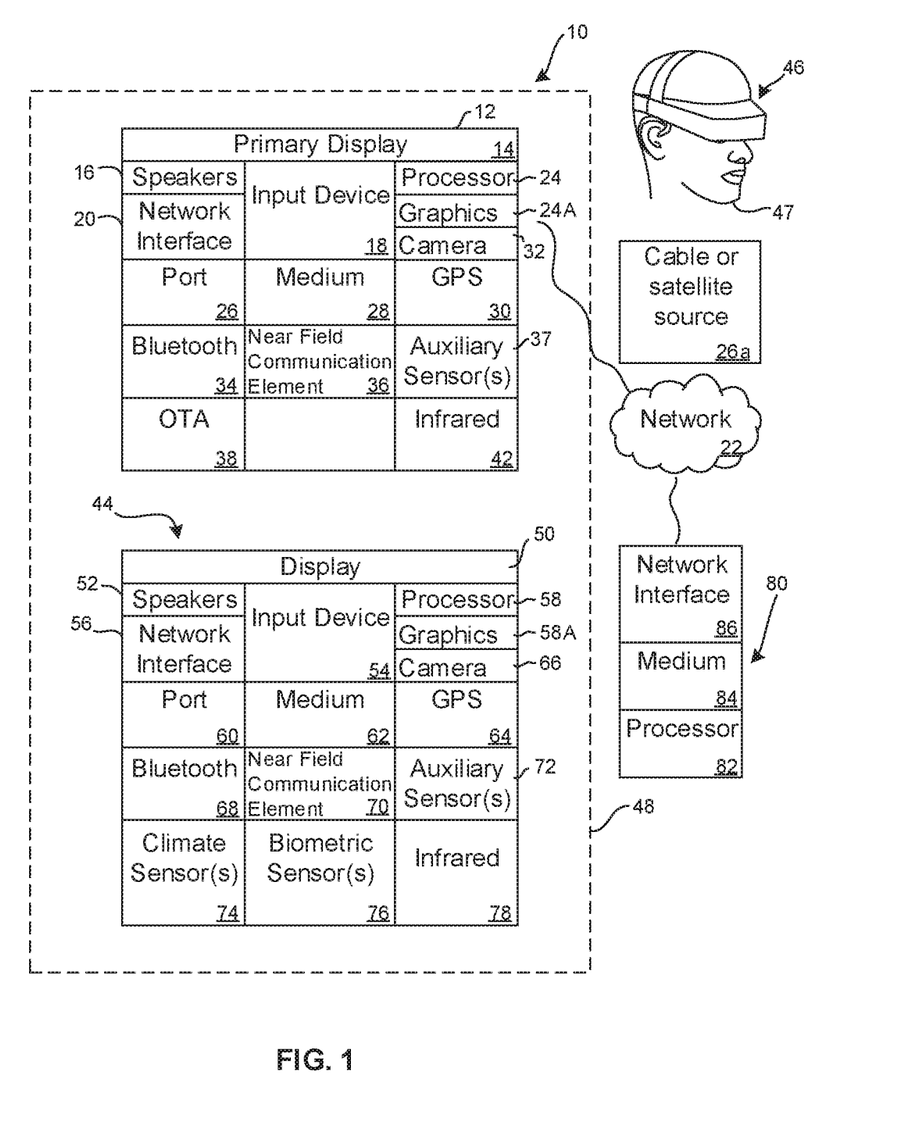
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be a computer game console used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game console, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

Figure 2:
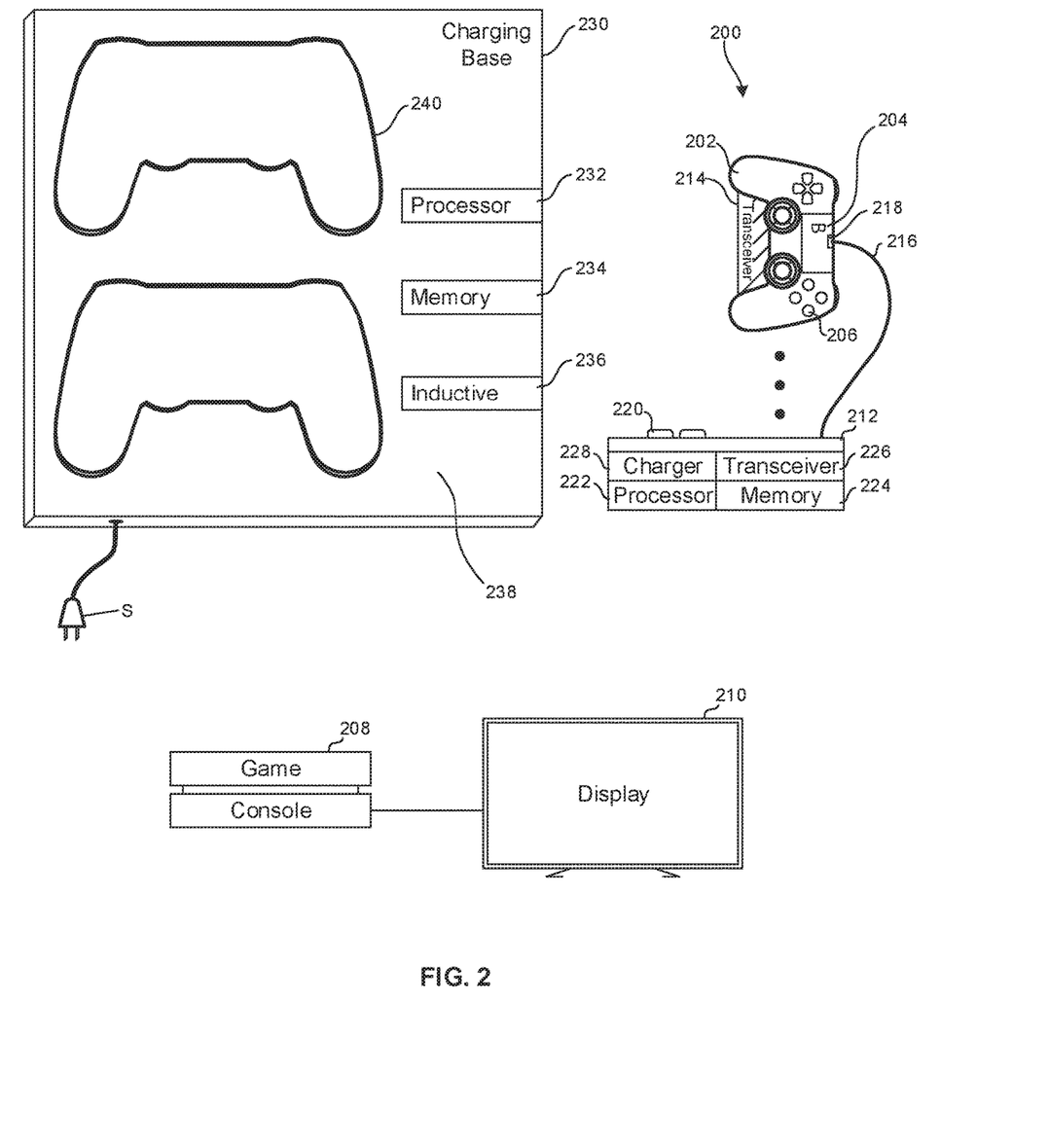
FIG. 2 is an illustration of the charging base, game controller, and in an exploded relationship with the game controller a wireless charging adapter (WCA), showing some components schematically.

FIG. 2 illustrates an example assembly according to present principles. A computer game controller 200 such as a PlayStation® Dual Shock 4 controller or other controller, including XBox® controllers, includes a hand-holdable controller housing 202 that contains one or more batteries 204 and plural control keys 206 that are manipulable to input commands via wired and/or wireless paths to a computer game console 208, such as a Sony PlayStation® console or Microsoft XBox® game console. The game console 208 presents computerized video games on a display 210 such as any suitable display described herein.

A wireless charging adapter (WCA) 212 is mechanically engageable with the game controller housing 202 and is electrically engageable with an electrical component in the controller housing 202 such as a signal transceiver assembly 214 (which may include a microprocessor) for purposes to be shortly disclosed. The WCA is also electrically connected to the battery 204 to charge the battery 204. In an example, charging current and signals from manipulating the keys on the WCA 212 may be sent through a wired or wireless link 216 to a universal serial bus (USB) port 218 of the game controller 200.

As shown, the WCA 212 includes one or more WCA keys 220 manipulable to input a command to the computer game console 208. The WCA keys 220 have corresponding functions to respective keys 206 on the game controller housing 202 and may have the same shape and size as the respective keys 206.

The example WCA 212 in FIG. 2 may also include a processor 222 accessing instructions on a memory 224 for executing logic embodied as code according to present principles. The WCA 212 may also include one or more communication transceivers 226 such as Wi-Fi or Bluetooth or other communication interfaces. Also, the WCA 212 includes circuitry 228 for charging the battery 204 in the game controller 200. The circuitry 228 may include a Qi coil and associated circuitry or it may include wireless recharging circuitry using standards other than Qi. The circuitry 228 may include conversion circuitry to convert AC power received from inductive coupling with the charging base described below to DC power to provide to the battery.

A charging base 230 is provided on which the WCA 212 while mechanically engaged with/to the game controller housing 202 can be placed to inductively couple the WCA with the charging base to supply charging power, e.g., from a wall socket "S" as shown, through the WCA to the battery 204 over a wireless charging path to recharge the battery. To this end, the base 230 may include a processor 232 and computer storage 234 for executing logic embodied as code according to present principles. The base 230 also includes inductive charging circuitry 236 that couples with the circuitry 228 in the WCA 212 to convey charge current to the battery 204 of the game controller 200.

Figure 3:
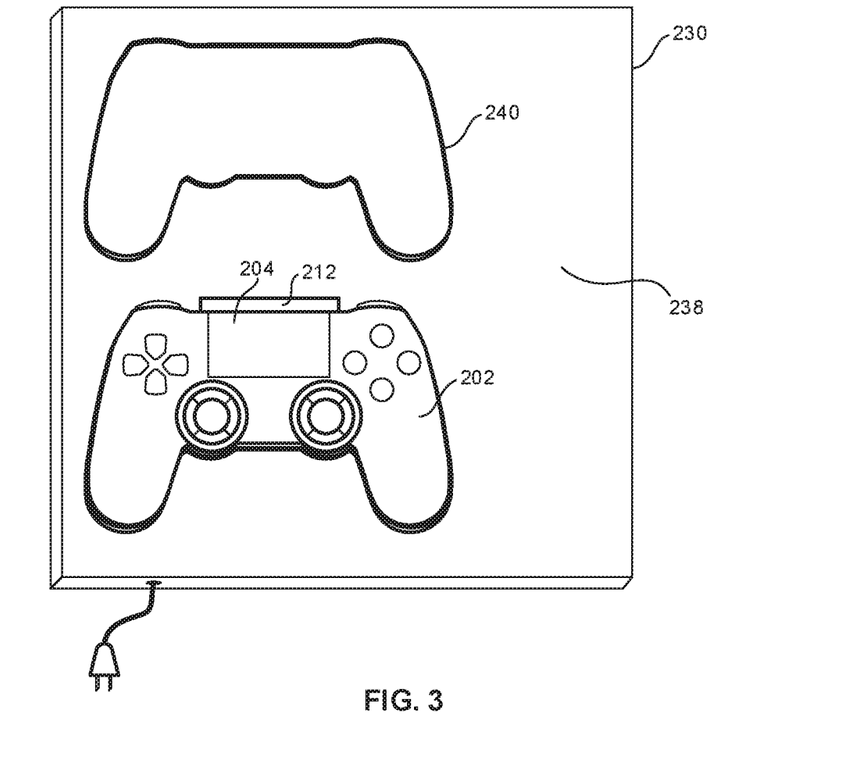
FIG. 3 is a view of the game controller with WCA resting on the charging base to wirelessly charge the battery of the game controller through the WCA.

In cross-reference to FIGS. 2 and 3, the charging base 230 includes a flat mat-like surface 238 on which the WCA 212 is positioned to charge the battery 204 of the game controller 200. The charging base can be configured to hold plural game controllers with respective adapters as shown at one time for charging the plural game controllers simultaneously, and to this end outlines 240 of the game controllers may be printed or otherwise formed on the surface 238 to aid in proper placement of the controller/adapter assembly on the base.

Figure 4:
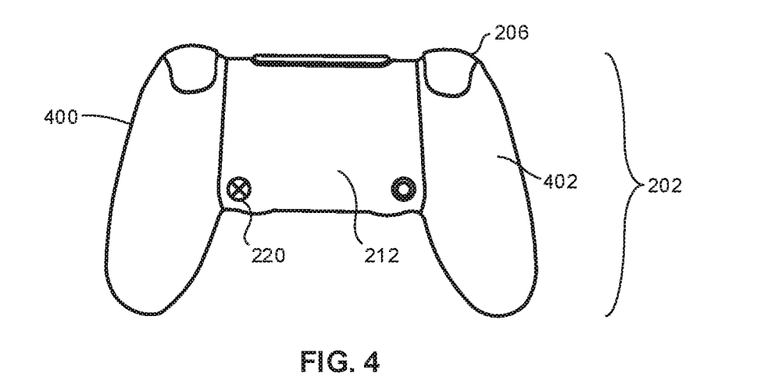
FIG. 4 shows the WCA mechanically engaged with the game controller during game play.

FIG. 4 shows that the controller housing 202 includes a front portion 400 holding the plural controller keys 206 and a rear portion 402 facing away from the front portion 400. The WCA 212 with WCA keys 220 is mechanically engageable with the rear portion 402 of the controller housing 202. The WCA 212 may be formed with structure to engage corresponding structure on the game controller housing 202 in an interference fit, or a snapping fit, so that the WCA 212 may be engaged and disengaged with the controller housing 202 by hand without the need for connectors such as threaded fasteners. In other embodiments, fasteners may be used.

Figure 5:
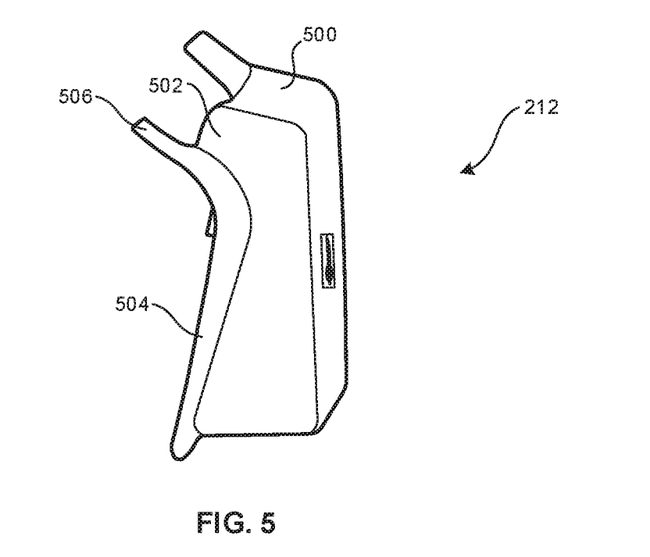
FIG. 5 shows the adapter in an example configuration.
Figure 6:
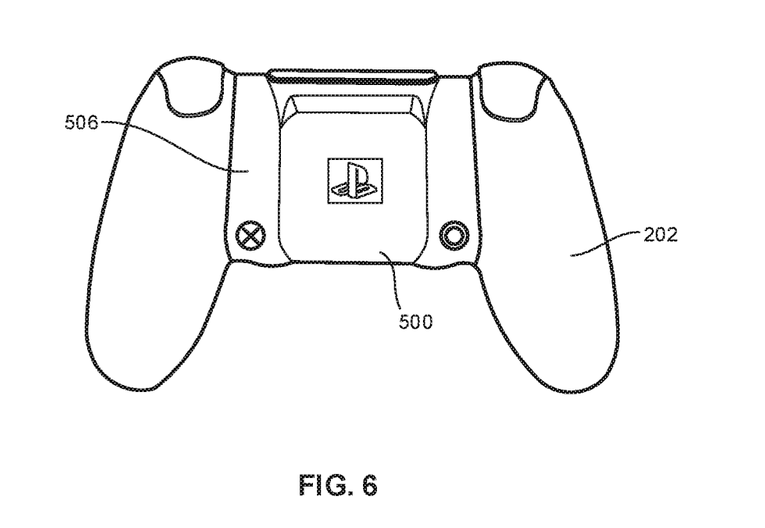
FIG. 6 illustrates the adapter of FIG. 5 mechanically coupled to the game controller.

FIGS. 5 and 6 illustrate an example embodiment of a WCA 212. As shown best in FIG. 5, the example WCA may be a unitarily-formed lightweight plastic or metal structure with a generally parallelepiped-shaped body 500 bounded on its rear side 502 by left and right flanges 504 that are thinner than the body 500 as shown. Respective left and right grip legs 506 may extend rearwardly away from the body (relative to the rear side 502) from each flange 504, with the flanges 504/legs 506 forming "L"-shaped engagement members as shown.

The WCA 212 may be mounted onto the game controller body 202 as shown in FIG. 6 by pushing the WCA 212 onto the body 202 such that the "L"-shaped engagement members of the WCA 212 engage respective structure on the body 202 in an interference fit.

In the discussions herein, it is to be understood that the divulged functionalities including illuminating lamps, transferring game commands from WCA key 212 manipulations, etc. may be effected by one or more processors in the WCA, one or more processors in the game controller that receive information from the WCA, one or more processors in the game console that communicate with the game controller and/or WCA, or any combination of the above.

Figure 7:
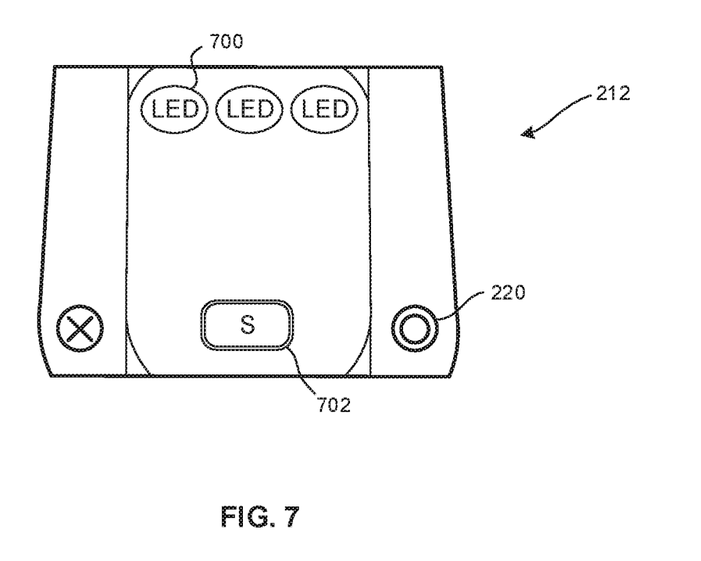
FIG. 7 illustrates additional features of an example adapter.

FIG. 7 illustrates additional features that may be provided on a WCA according to present principles in example implementations. FIG. 7 illustrates one or more of the WCA keys 220 discussed above in reference to FIG. 2, showing one key on each respective flange 504, it being understood that other key locations on the WCA may be used. In general, each WCA key 220, when manipulated, causes a signal to be generated to command a function through the controller to the game console that is a copy the functionality of the commands when one or more dedicated keys of the game controller are manipulated. Thus, the same command functionality may be input by manipulating wither a WCA key or the game controller key copied by the WCA key. Preferably, the WCA keys 220 are strategically located on the WCA for accessibility by one or more fingers of the user when, for example, the user holds the game controller naturally in the orientation intended with his or her fingers at rest, hovering over the WCA keys 220. Note that one or more of the WCA keys 220 may be simple toggle-like buttons or may be pressed bi-directionally, i.e., pulled like a trigger and pushed towards the front/outside of the WCA to establish two separate commands, one for each action.

As also shown in FIG. 7, the WCA 212 may support one or more lamps 700. In an example, the lamps 700 may be light emitting diodes (LEDs) each with multiple illuminating elements to emit respective different colors, e.g., red and green. The lamps 700 may be used for multiple purposes. For example, the lamps 700 can be selectively illuminated to indicate which WCA keys 220 are mapped to which controller keys 206. For example, a set pattern of illumination or sequence of lamp flashing can be used in an intuitive and informative manner to the user to know what controller keys are mapped to the WCA keys. As but one example, the lamps 700 may be illuminated left to right to indicate that the function of the right-most controller key 206 is mapped to a WCA key 220, such as the right-most WCA key. Or, the lamps 700 may be arranged on the WCA 212 in the same pattern as the controller keys 206 are arranged on the controller, with the lamps in corresponding locations of controller keys whose functions are mapped to WCA keys being illuminated and the remaining lamps remaining off.

The lamps 700 may also be selectively illuminated to indicate that the adapter/controller is in charging mode. For example, one or more green lamps may be flashed on and off to indicate charging. The lamps may also be selectively illuminated to indicate a level of charge of the battery in the game controller. For example, one green lamp illuminated may indicate a relatively low level of charge while two green lamps illuminated may indicate a higher amount of charge remaining, and so on. Selective lamp illumination may also indicate both conditions of the controller with WCA being on the charging mat and charging and also being distanced from the mat and not charging but the controller is turned on and in use. Still further, the lamps 700 may be selectively illuminated to indicate that the adapter/controller not placed correctly on the charging mat to charge correctly or efficiently, e.g., by causing one or more red lamps 700 to flash.

In some implementations, the functions of the WCA keys 220 are established by the manufacturer to have default functions, e.g., the functions of predetermined keys "A" and "B" of the game controller 200. If desired, the functional mapping of the WCA keys 220 can be changed to the functionality of any game controller key 206 as desired by the user. To this end, a settings key 702 may be provided on the WCA 212 as shown in FIG. 7, with attention now turned to FIG. 8.

Figure 8:
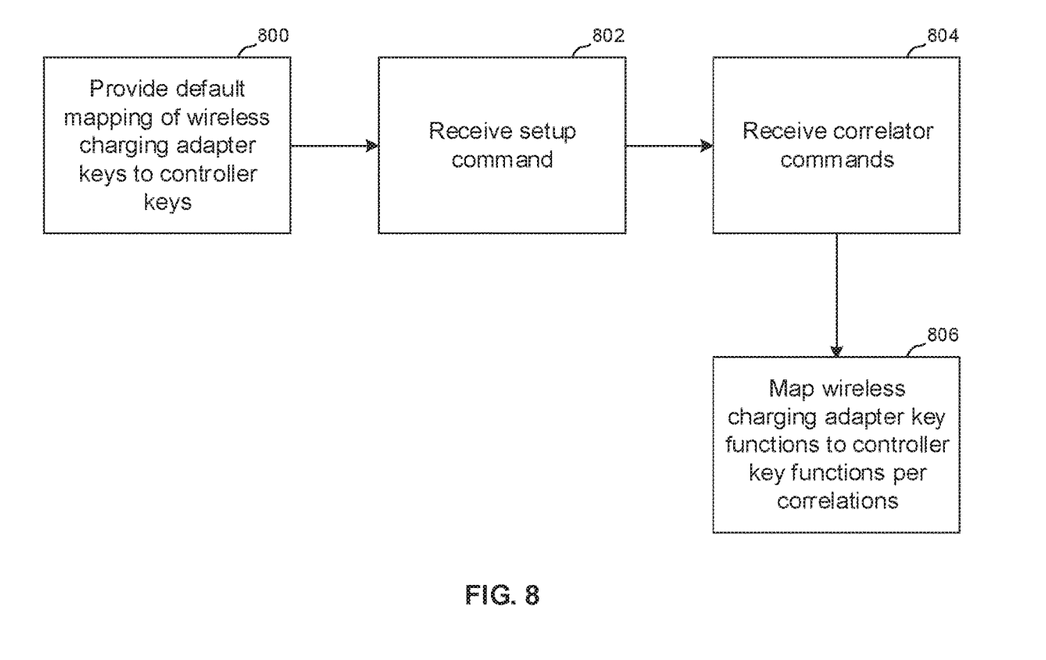
FIGS. 8 and 9 are flow charts of example logic according to present principles.

At block 800, as mentioned above the functions of the WCA keys 220 are established by, e.g., the manufacturer to have default functions corresponding to the functions of respective keys on the game controller 200. Moving to block 802, a setup command may be received. In one implementation, a setup command may be generated by a certain sequence of WCA key presses, if desired in combination with manipulation of the settings key 702 shown in FIG. 7. Correlation commands may be received at block 804 to correlate WCA key functions with game controller key functions. These commands may be established by simultaneously pressing a WCA key and the key on the game controller whose function is desired to be mapped to the manipulated WCA key. Based on these correlation commands, at block 806 the WCA keys are accorded the functions of the game controller keys to which they have been mapped.

Figure 9:
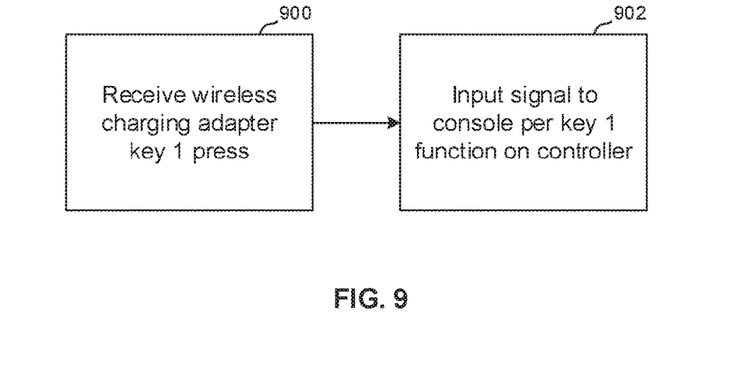

FIG. 9 illustrates that once WCA key functions have acquired the desired game controller key functions, at block 900 a WCA key manipulation may be received during game play. This causes a signal representing the function of the manipulated WCA key to be input to the game console, typically through the game controller, at block 902. Manipulation of the corresponding game controller key also causes the same command function to be input to the game console.

Figure 10:
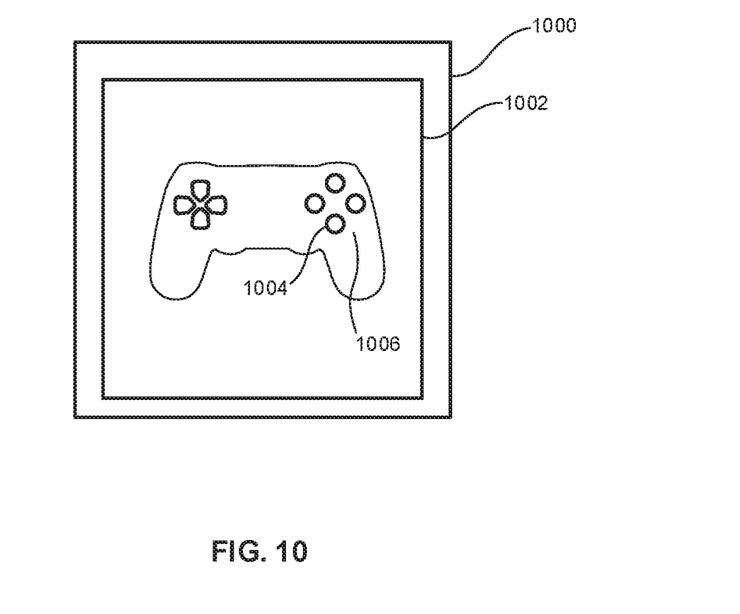
FIG. 10 is a screen shot of an embodiment of the adapter with a touch screen display.
Figure 11:
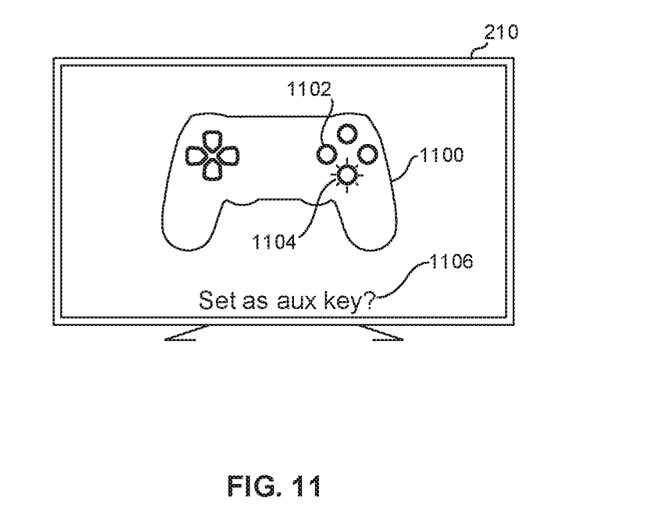
FIG. 11 is a screen shot of a display driven by a game console to facilitate defining functions of the keys on the adapter.

FIGS. 10 and 11 show alternate techniques for mapping game controller key functionality to the WCA keys 220. In FIG. 10, a WCA 1000 that is in all essential respects identical to those described previously is shown, with the following exceptions. The WCA 1000 in FIG. 10 may include a touch sensitive display 1002 with "soft" keys 1004 presented on the display 1002 in an arrangement that is the same arrangement 1006 as that of the game controller keys on the game controller. Indeed, an outline of the game controller may be provided as shown. The WCA keys 1004 have the same functions as the corresponding game controller keys have that are in the corresponding locations of the key arrangement on the game controller.

In FIG. 11, the display 210 shown in FIG. 2 is caused by the game console to present an image 1100 of the game controller with modeled game controller keys 1102. The modeled game controller keys 1102 can, for example, be caused to flash (as indicated at 1104) one at a time for a short period each, with a prompt 1106 being presented to indicate that a press of a WCD key will result in the pressed key being given the function of the game controller key that corresponds to the flashing modeled game controller key 1104. A user thus may view the display 210 and wait until a desired game controller key flashes, then press the WCA key that the user wishes to be accorded the function of the game controller key corresponding to the flashing image on the display 210.

Figure 12:
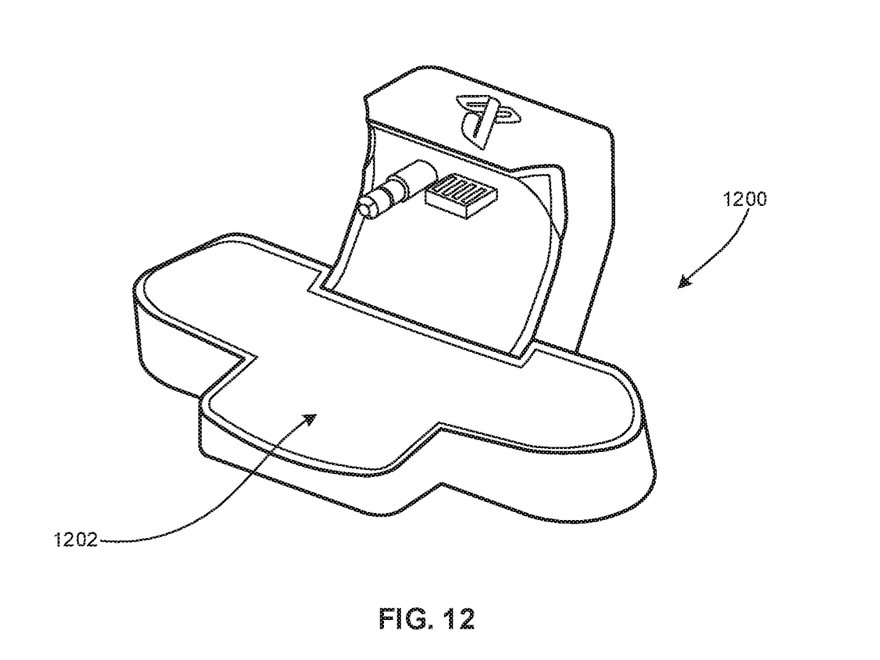
FIGS. 12 and 13 are front and reverse (bottom) views of a controller adaptor that adds to the functionality of a game controller keys on a back of the adapter in addition to the keys on the game controller which engages the front of the adaptor.
Figure 13:
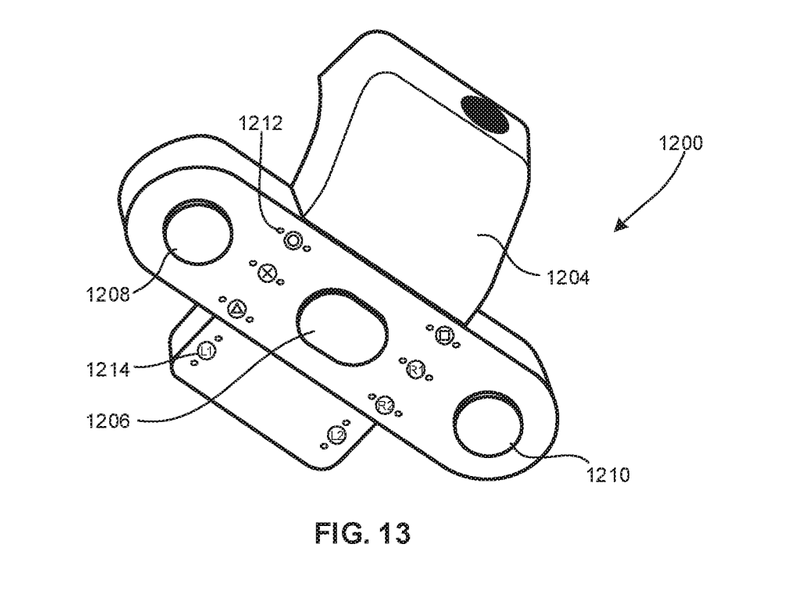

FIGS. 12 and 13 illustrate an implementation of an adapter 1200 which omits the battery charging feature, and which is formed with a bay 1202 on a front side to receive a game controller. It is to be appreciated that the bay 1202 may be configured complementarily to the back surface of the game controller.

The bottom or rear 1204 surface of the adapter 1200 is opposite the bay 1202 as shown, any may include a set key 1206 and left and right command keys 1208, 1210. Indicators 1212 such as light emitted diodes (LEDs) may be visible on the bottom or rear surface 1204 as shown, and next to each indicator a respective icon 1214 may be printed or molded or etched or otherwise formed. The icons 1214 can represent respective keys on the game controller and can be presented with the same shape and features of the game controller keys.

To map a game controller key to one of the left or right adapter keys 1208, 1210, a user can press the set key 1206 and then press the left or right key 1208, 1210 sought to be mapped. The first press of the key sought to be mapped may illuminate a first one of the indicators 1212. The user can look at the illuminated indicator and corresponding icon and if the user wishes to map the corresponding game controller key to the adapter key sought to be mapped, release both the set key and the adapter key sought to be mapped. If the user wishes to map a different controller key to the adapter key sought to be mapped, he presses the adapter key sought to be mapped again, which causes another indicator 1212 to be illuminated for mapping the controller key represented by the icon 1214 associated with the indicator to the adapter key sought to be mapped according to principles above. The user can scroll through the indicators (and hence game controller keys) in this fashion by holding down the set key 1206 and toggling the adapter key sought to be mapped until the indicator representing the sought-after game controller key is illuminated, at which time the user releases the adapter keys to establish the mapping.

In other implementations, instead of a toggle-like set key 1206, a multi-position toggle may be implemented and positioned to one of multiple settings, with each setting corresponding to a respective game controller key, to map the respective game controller key to whichever of the left and right adapter keys 1208, 1210 is being pressed.

Returning to FIG. 12, an electrical connector 1216, which may be removably engaged with the adapter 1200, may extend away from the adapter 1200 into the bay 1202 to mechanically and electrically engage a complementarily-configured fitting on the game controller to mechanical stability plus an electrical connection pass-through, e.g., for a headphone connection. The connector 1216 is electrically connected to an electrical port 1218 that may receive, e.g., a headphone jack to establish electrical connection between the headphone jack and the game controller through the electrical connector 1216.

It will be appreciated that whilst present principals have been described with reference to some example embodiments, these are not intended to be limiting, and that various alternative arrangements may be used to implement the subject matter claimed herein.

What is claimed is:

1. An assembly, comprising:
   at least one game controller, the game controller comprising a hand-holdable controller housing comprising at least one battery and plural control keys manipulable to input commands including at least a first key manipulable to input a first command to a computer game console;
   at least one adapter mechanically engageable with the game controller and electrically engageable with at least one electrical component in the controller housing, the adapter comprising at least one adapter key manipulable to input the first command to the computer game console.

2. The assembly of claim 1, comprising at least one charging base on which the adapter mechanically engaged with/to the game controller can be placed to inductively couple the adapter with the charging base to supply charging power through the adapter to the battery over at least one wireless charging path to recharge the battery, wherein the charging base comprises a flat mat-like surface on which the adapter is positioned to charge the battery.

3. The assembly of claim 1, wherein the adapter is electrically engageable with the at least one electrical component in the controller housing through at least one electrical wire engaged with an input/output port on the game controller.

4. The assembly of claim 1, wherein the controller housing comprises a front portion holding the plural keys and a rear portion facing away from the front portion, and the adapter is mechanically engageable with the rear portion of the controller housing.

5. The assembly of claim 1, wherein the adapter is snappingly engageable and disengageable with the controller housing by hand without tools and without requiring connectors to hold the adapter on the controller housing.

6. The assembly of claim 1, wherein the adapter comprises one or more lamps to indicate a state of a battery in the game controller.

7. The assembly of claim 2, wherein the charging base is configured to hold plural game controllers at one time for charging the plural game controllers simultaneously.

8. The assembly of claim 1, wherein the controller includes at least a second key manipulable to input a second command to a computer game console, the adapter key is a first key, and the adapter comprises:
at least a second key manipulable to input the second command to the computer game console.

9. The assembly of claim 1, wherein the adapter comprises one or more lamps to indicate a functional mapping of game controller keys to adapter keys.

10. The assembly of claim 2, wherein the adapter comprises conversion circuitry to convert AC power received from inductive coupling with the base to DC power to provide to the battery.

11. A system comprising:
at least one wireless charging adapter (WCA) comprising:
a body that can snap onto a computer game controller comprising controller keys;
an inductive circuit configured to be inductively coupled to a charging base to wirelessly recharge a battery in the computer game controller; and
one or more keys that mirror respective controller keys on the computer game controller so that a gamer can remove the WCA with computer game controller from the charging base, keep the WCA on the computer game controller, and use both the controller keys and one or more adapter keys to control a computer game.

12. The system of claim 11, comprising the computer game controller.

13. The system of claim 11, comprising the charging base.

14. The system of claim 11, comprising a computer game console configured for executing commands generated by manipulating the controller keys and one or more adapter keys.

15. The system of claim 11, wherein the WCA is electrically engageable with at least one electrical component in the computer game controller through at least one electrical wire engaged with a universal serial bus (USB) port on the computer game controller.

16. A method, comprising:
mechanically coupling a wireless charging adapter (WCA) with a computer game controller;
operating the WCA to send commands to a computer game console;
operating the computer game controller to send commands to the computer game console; and
placing the WCA on a charging base to recharge a battery in the computer game console.

17. The method of claim 16, comprising inductively coupling the WCA to the charging base to provide a wireless recharge path from the charging base to the computer game controller.

18. The method of claim 16, comprising electrically connecting the WCA to the computer game controller.

19. The method of claim 18, comprising electrically connecting the WCA to the computer game controller through at least one universal serial bus (USB) port on the computer game controller.

20. The method of claim 16, wherein the computer game controller comprises a front portion holding plural keys and a rear portion facing away from the front portion, and the method comprises:
snapping the WCA onto the rear portion.

* * * * *

UNITED STATES PATENT AND TRADEMARK OFFICE
CERTIFICATE OF CORRECTION

PATENT NO. : 10,661,161 B2  Page 1 of 1
APPLICATION NO. : 16/111836
DATED : May 26, 2020
INVENTOR(S) : Bruckbock It is certified that error appears in the above-identified patent and that said Letters Patent is hereby corrected as shown below:

In the Claims

Claim 16 in Column 14, Line 18 replace the word "console" with the word -controller-.

Signed and Sealed this
Fifteenth Day of September, 2020

Andrei Iancu
*Director of the United States Patent and Trademark Office*